Figure 1:
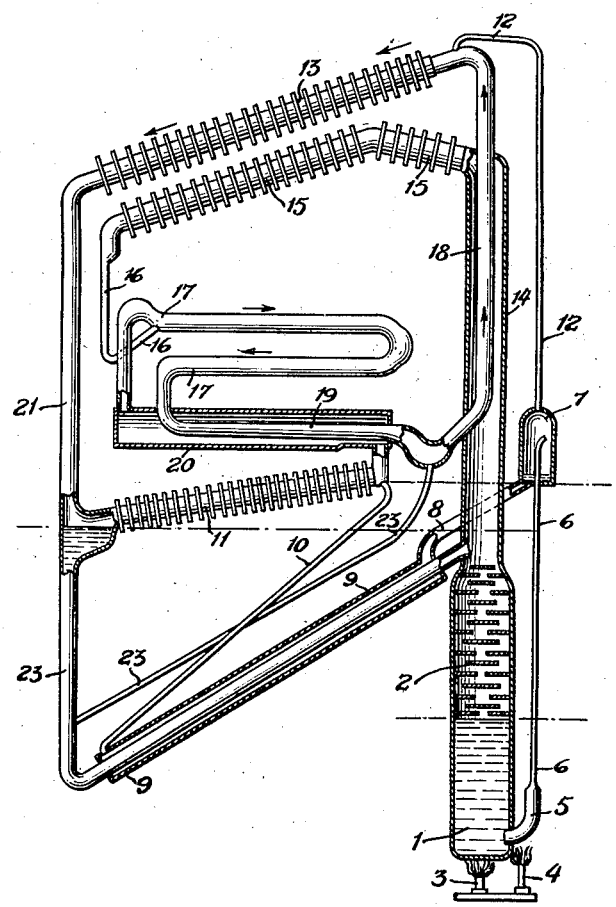

May 29, 1934.      G. MAIURI ET AL      1,960,821
REFRIGERATION
Filed July 1, 1930      2 Sheets-Sheet 1

INVENTORS
*Guido Maiuri*
*Raoul Felice Bosini*
BY
*W. T. Hedlund*
*their* ATTORNEY

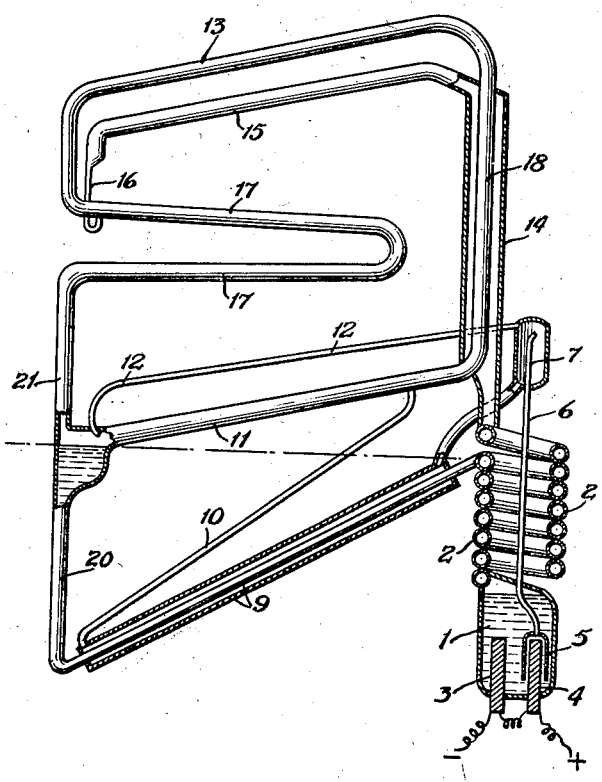

Patented May 29, 1934

1,960,821

UNITED STATES PATENT OFFICE 1,960,821

REFRIGERATION

Guido Maiuri and Raoul Felice Bossini, London, England, assignors, by mesne assignments, to Electrolux Servel Corporation, a corporation of Delaware Application July 1, 1930, Serial No. 465,080
In Great Britain July 6, 1929

23 Claims. (Cl. 62—119.5)

Our invention relates to a new process of refrigeration and apparatus therefor.

The invention makes use of a mixture of two fluids having different boiling points, that is to say, one more volatile than the other, for instance ammonia and water. The mixture is separated into its constituent parts in a generator, analyzer and rectifier column, the more volatile fluid passing from the top of the column into a condenser where it is liquefied and from which it passes into an evaporator to produce cold.

The less volatile fluid which collects at the bottom of the column is raised by vaporization to a separation chamber from which it flows by gravity through a heat exchanger and into an absorber. In the absorber, the less volatile fluid absorbs the vapor of the more volatile fluid, ammonia, which flows to the absorber from the evaporator and the solution thus formed flows to the analyzer column, entering it at a convenient height.

The vapor separated in the separation chamber passes to a second condenser, which is connected in the circuit of the evaporator and absorber, where it is condensed and absorbs a portion of the ammonia vapor, and the liquid so obtained flows to the heat exchanger together with the liquor coming from the absorber.

The pressure is equalized by means of an inert gas which is made to circulate in one of several known ways between the evaporator, the second condenser and the absorber, which elements are connected in series and to form a complete circuit. The circulation of the inert gas can also be produced by an ejector operated by the water vapor introduced into the second condenser. This process can be facilitated by introducing, in convenient quantities, a third fluid having a degree of volatility between the other two. For instance with water and ammonia this third fluid can be alcohol. The alcohol, in such case, remains with the water at the bottom of the generator in place of the small quantity of ammonia, which otherwise would be difficult to eliminate. The vapor of the alcohol mixed with that of the water passes into the second condenser and is condensed together with ammonia vapor, and can also be utilized, because of its very high specific weight, to accelerate the circulation.

The condensation in the second condenser and the absorbing process in the first part of the absorber, where the absorption fluid is introduced in substantially pure state, can take place at high temperature, and so the heat of condensation and absorption can be partially utilized to heat the analyzer, thus increasing the efficiency of the apparatus. This process of refrigeration may be carried out with hot circulating water or with air cooling even in tropical countries.

We mention ammonia, water, and alcohol as examples, but many other different fluids can be used. It is possible to choose the fluids so as to make the use of an inert gas unnecessary, the difference of pressure being so small that the return to the rectifier can be obtained by difference of level. It is also possible with a proper construction of the apparatus to utilize the atmospheric air which initially fills the apparatus, or any other gas which can replace the air at atmospheric pressure.

In order that our invention may be properly understood and readily carried into effect, we have hereunto appended two sheets of drawings, of which Fig. 1 is a view, partially in cross-section of an apparatus constructed in accordance with our invention; and Fig. 2 is a view, partially in cross-section of a somewhat modified embodiment of our invention.

Referring to Fig. 1 of the drawings, reference character 1 designates a generator which is heated at the bottom by the flames from the gas burners 3 and 4, or other convenient means. Above the generator proper there is an analyzer 2. Separation of fluids takes place in the generator 1 and analyzer 2. For instance, the apparatus can operate with ammonia as refrigerant and water as absorption liquid, and at the bottom of the generator 1 very weak liquor or substantially pure water is obtained by proper operation and by the proper dimensions of the generator 1 and analyzer 2. By vaporization in the tube 5, the pure water is raised through the tube 6 into a separation vessel 7 and the quantity raised can be regulated by regulating the intensity of heat given off by the flame from the gas burner or the like 4. In the vessel 7, the water is separated from its vapor, the water flowing by gravity through the conduit 8 into the heat exchanger 9 and thence through the conduit 10 into the absorber 11. The vapor which has been separated in the vessel 7 is discharged through the conduit 12 into the condenser 13. The ammonia vapor freed in the generator 1 and analyzer 2 passes into the rectifier 14 in which it transmits heat to the inert gas, thus causing its circulation as described in our U. S. Pat. No. 1,758,099 granted May 13, 1930, and flows into the main condenser 15 where it becomes liquefied. The liquid ammonia passes through the siphon shaped tube 16 to the refrigeration coil or evaporator 17, the evaporation in this coil taking place in the presence of an inert gas in a manner similar to that described in our said Pat. No. 1,758,099, the inert gas being circulated in the direction indicated by the arrows. The inert gas and ammonia vapor flow downwardly through the coil 17 and pass through the gas heat exchanger 19, 20, and are heated in the ascending conduit 18. The gaseous mixture then flows through the condenser 13, the conduit 21, and into the absorber 11 where it flows in counter-flow with the weak liquor, which weak liquor absorbs the ammonia, the inert gas then returning through the heat exchanger 20 to the evaporator coil 17.

The water vapor introduced through the pipe 12 into the condenser 13 is condensed and absorbs part of the ammonia contained in the rich inert gas coming from the conduit 18. The separation of the ammonia from the inert gas is obtained in accordance with our invention, not only by absorption thereof in the weak liquor in the absorber, as in the known apparatuses, but partially in this known manner and partially by introducing water vapor into the mixture of ammonia vapor and inert gas in the secondary condenser 13, condensing the water vapor and absorbing a portion of the ammonia vapor in the water resulting from the condensation.

By employing these two actions or stages for the separation of the ammonia from the inert gas, a much larger capacity is obtained which enables the machine to operate with good efficiency with air cooling, even with very high temperatures of the air.

We have illustrated in Fig. 1 of the drawings, the condenser and the absorber cooled by air, but water cooling can naturally be used if it is preferred. In this case the apparatus will operate with high water temperatures with good efficiency.

In accordance with the invention the liquid supplied to the absorber 11 may be pure or substantially pure water. Consequently the temperature of absorption can be very high and, if desired, part of the heat of absorption can be utilized for the purpose of evaporating ammonia in the analyzer 2, if a good transmission of heat is established directly or through an intermediary agent. We have not shown such an arrangement in Fig. 1 in order to avoid complication. The tube 23 acts as a drain, which discharges the liquid which would otherwise accumulate between the conduits 19 and 18, thus avoiding the danger of interrupting the circulation of inert gas.

It will be readily understood that, if we add alcohol to the ammonia and water, the alcohol will remain with the water at the bottom of the generator 1 and the vapors separated in the vessel 7 will be made up of alcohol vapor and water vapor. Alcohol vapor will pass up through the tube 12 into the condenser 13 and inasmuch as the specific weight of this vapor is greater than that of hydrogen, the introduction of alcohol vapor will increase the specific weight of the descending column of gas with respect to the ascending column and hence will accelerate the circulation of the inert gas.

Referring to Fig. 2, in which the secondary condenser is incorporated with the absorber, the analyzer 2 is in the form of a coil, the liquor flowing down by gravity, and the vapor ascending in contact and counter-flow with the said liquor. The contact throughout this long path of the liquor and the vapor enables a good analyzer action if the dimensions are well calculated. The generator 1 is heated by the electric elements 3 and 4, or by any other suitable means, the element 4 being used principally for circulation, raising the liquid in the pipes 5 and 6 by ebullition or vaporization. The liquid separated in the vessel 7 flows to the absorber 11, as described with reference to Fig. 1. The vapor flows through the conduit 12 to the lower end of the absorber 11, where it mixes with the inert gas and ammonia and condenses and absorbs part of the ammonia. The condensation takes place in the absorber 11. For this reason the absorber must have greater dimensions than the absorber in Fig. 1, but the two actions of condensing and absorbing ammonia from the inert gas are the same as before described. The inert gas circulation is caused by heating in the conduit 18 and cooling in the condenser 13. The absorber 11, the condenser 15 and the condenser 13 must be cooled by some means, such as water cooling or air cooling, or indirect cooling by water circulating by thermosiphonic action and absorbing the heat from the apparatus and transmitting the same to the air. This cooling device is not shown in Fig. 2.

It is obvious that, instead of two heating devices, only one may be used by properly proportioning the part of the heat utilized for boiling and the part utilized for circulation.

Having thus described our invention, what we claim is:

1. The process of refrigeration which comprises introducing a liquid refrigerant into the presence of an inert gas, evaporating the refrigerant, producing flow of the resulting gaseous mixture to a higher level, introducing into said gaseous mixture at the higher level a vapor having a greater specific weight than said inert gas, producing flow of the resulting heavier gaseous mixture downwardly, cooling said heavier gas mixture in its downward flow, absorbing the refrigerant and the heavy vapor, and producing flow of the inert gas back to the point of introduction of refrigerant.

2. The process of refrigeration which comprises introducing a liquid refrigerant into the presence of an inert gas, evaporating the refrigerant, producing flow of the resulting gaseous mixture to a higher level, introducing into said gaseous mixture at the higher level a vapor having a greater specific weight than said gaseous mixture, producing flow of the resultant gaseous mixture downwardly, cooling said mixture in its downward flow, absorbing the refrigerant and the heavy vapor, and producing flow of the inert gas back to the point of introduction of refrigerant.

3. In an absorption refrigerating apparatus, a circuit for the circulation of an inert gas comprising an evaporator, an absorber and connecting conduits, means for introducing a refrigerant into said evaporator, means for introducing a vapor having a different specific weight than the gaseous mixture of refrigerant and inert gas into said circuit for promoting flow of said mixture from said evaporator to said absorber, and means for externally cooling said circuit between the point of introduction of said vapor and the absorber.

4. In an absorption refrigerating apparatus, a circuit for the circulation of an inert gas comprising an evaporator at one level, an absorber at a different level and connecting conduits, means for introducing a refrigerant into said evaporator, means for introducing a vapor having a different specific weight than the gaseous mixture of refrigerant and inert gas into said circuit for promoting flow of said mixture from said evaporator to said absorber, and means for air-cooling said circuit between the point of introduction of said vapor and said absorber.

5. In an absorption refrigerating apparatus, a circuit for the circulation of an inert gas comprising an evaporator at one level, an absorber at a different level and connecting conduits, one of said conduits extending above said evaporator and said absorber, means for introducing a refrigerant into said evaporator, and means for inintroducing a vapor having a greater specific weight than the gaseous mixture of refrigerant and inert gas into the conduit above said evaporator and absorber for promoting flow of said mixture from said evaporator to said absorber.

6. In an absorption refrigerating apparatus, a circuit for the circulation of an inert gas comprising an evaporator at one level, an absorber at a lower level and connecting conduits, means for introducing a refrigerant into said evaporator, and means for introducing a vapor having a greater specific weight than the gaseous mixture of refrigerant and inert gas into said circuit and cooling said vapor and mixture for promoting flow of said mixture from said evaporator to said absorber.

7. In an absorption refrigerating apparatus, a circuit for the circulation of an inert gas comprising an evaporator at one level, an absorber at a lower level and connecting conduits, one of said conduits extending above said evaporator, means for introducing a refrigerant into said evaporator, and means for introducing a vapor having a greater specific weight than the gaseous mixture of refrigerant and inert gas into the conduit above said evaporator for promoting flow of said mixture from said evaporator to said absorber.

8. In an absorption refrigerating apparatus, a circuit for the circulation of an inert gas comprising an evaporator, an absorber and connecting conduits, means for introducing refrigerant into said evaporator, means for conducting a gaseous mixture of refrigerant and inert gas from said evaporator to said absorber, means for introducing vaporous absorption fluid into said circuit, means for condensing said vaporous absorption fluid while in said circuit, and means for introducing liquid absorption fluid into said absorber.

9. In an absorption refrigerating apparatus, a circuit for the circulation of an inert gas comprising an evaporator, an absorber and connecting conduits, means for introducing refrigerant into said evaporator, means for conducting a gaseous mixture of refrigerant and inert gas from said evaporator through one of said conduits to said absorber, means for cooling a portion of the last mentioned conduit, means for introducing vaporous absorption fluid into the cooled portion and means for introducing liquid absorption fluid into said absorber.

10. In an absorption refrigerating apparatus, a circuit for the circulation of an inert gas comprising an evaporator, an absorber and connecting conduits, one of said conduits extending above said evaporator and thence downwardly to said absorber, means for cooling a portion of the downwardly extending part of said conduit, means for introducing refrigerant into said evaporator, said circuit being arranged for the flow of a gaseous mixture of refrigerant and inert gas from said evaporator through the last mentioned conduit to said absorber and means for introducing vaporous absorption fluid and a vapor having a greater specific weight than said mixture into the cooled portion of said conduit.

11. That improvement in the art of refrigeration which comprises evaporating a refrigerant in the presence of an inert gas, introducing vaporous absorption fluid into the gaseous mixture of refrigerant and inert gas, condensing the vaporous absorption fluid, absorbing a portion of the gaseous refrigerant in the condensate thus formed, passing the remaining gaseous mixture in contact with liquid absorption fluid and absorbing gaseous refrigerant in said liquid absorption fluid.

12. That improvement in the art of refrigeration with the aid of an absorption system comprising a generator, a first condenser, an evaporator, a second condenser, an absorber and connecting conduits which consists in heating a solution of volatile refrigerant and less volatile medium dissolved in a still less volatile absorbent in said generator to produce vaporous refrigerant, liquefying the vaporous refrigerant in said first condenser, evaporating the liquid refrigerant in the presence of an inert gas in said evaporator, conducting the gaseous mixture of refrigerant and inert gas to said second condenser, generating vapors of said medium and absorbent, introducing said vapors into said second condenser, liquefying the vaporous absorbent, absorbing a portion of the gaseous refrigerant in the liquefied absorbent, conducting gaseous refrigerant, inert gas and said vaporous medium to said absorber, introducing absorption liquid into said absorber, absorbing gaseous refrigerant and vaporous medium in the absorption liquid and conducting the resulting solution back to said generator.

13. That improvement in the art of refrigeration with the aid of an absorption system comprising a generator, a condenser, an evaporator, an absorber and connecting conduits which consists in heating a solution of a volatile refrigerant and less volatile medium dissolved in a still less volatile absorbent in said generator to produce vaporous refrigerant, liquefying the vaporous refrigerant in said condenser, evaporating the liquid refrigerant in the presence of an inert gas in said evaporator, conducting the gaseous mixture of refrigerant and inert gas to said absorber, generating vapors of said medium and absorbent, introducing said vapors into the presence of said mixture, liquefying the vaporous absorbent, absorbing a portion of the gaseous refrigerant in the liquefied absorbent, introducing absorption liquid into said absorber, absorbing gaseous refrigerant and vaporous medium in the absorption liquid and conducting the resulting solution back to said generator.

14. That improvement in the art of refrigeration with the aid of an absorption system comprising a generator, a condenser, an evaporator, an absorber and connecting conduits which consists in heating a solution of ammonia and alcohol dissolved in water to produce vaporous ammonia, liquefying the vaporous ammonia in said condenser, evaporating the liquid ammonia in the presence of hydrogen gas in said evaporator, conducting the gaseous mixture of ammonia and hydrogen to said absorber, generating vapors of alcohol and water, introducing said vapors into the presence of said mixture, liquefying the water vapor, absorbing a portion of the gaseous ammonia in the resulting water, introducing water into said absorber, absorbing gaseous ammonia and alcohol vapor in the water and conducting the resulting solution back to said generator.

15. In an absorption refrigerating apparatus, a generator, a condenser, an absorber, a separation vessel, means for withdrawing absorption fluid from the lower part of said generator and introducing said absorption fluid into said separation vessel partly in vapor form, means for conducting absorption liquid from said separation vessel to said absorber and means for conducting vapor of absorption liquid from said separation vessel to said condenser.

16. In an absorption refrigerating apparatus, a generator, a first condenser, an evaporator, a second condenser, an absorber, a separation vessel, means for conducting vaporous refrigerant from the upper part of said generator to said first condenser, means for conducting liquid refrigerant from said first condenser to said evaporator, means for conducting vaporous refrigerant from said evaporator to said second condenser, means for withdrawing absorption fluid from the lower part of said generator and introducing said absorption fluid into said separation vessel partly in vapor form, means for conducting vapor of absorption liquid from said separation vessel to said second condenser, means for conducting absorption liquid from said separation vessel to said absorber, means for conducting fluid from said second condenser to said absorber, and means for conducting liquid from said absorber to said generator.

17. Refrigerating apparatus comprising a generator, analyzing means, an evaporator, an absorber, conduits connecting the evaporator and absorber for circulation of gas including a downwardly extending portion, means to cool said downwardly extending portion, means to withdraw absorption liquid from the lower part of said generator and vaporize said absorption liquid, means to conduct the vapor of the absorption liquid thus formed into said downwardly extending portion, and conduits for completing a circuit of circulation of absorption liquid between the generator and the absorber.

18. Refrigerating apparatus comprising a generator, analyzing means, an evaporator, an absorber, conduits connecting the evaporator and absorber for circulation of gas including a downwardly extending portion, means to cool said downwardly extending portion, means to withdraw absorption liquid from the lower part of said generator and vaporize said absorption liquid, means to conduct the vapor of the absorption liquid thus formed to said downwardly extending portion and introduce the vapor therein without appreciable drop in pressure, and conduits for completing a circuit of circulation of absorption liquid between the generator and the absorber.

19. Refrigerating apparatus comprising a generator, analyzing means, an evaporator, an absorber, conduits connecting the evaporator and absorber for circulation of gas including a downwardly extending portion, means to air-cool said downwardly extending portion, means to withdraw absorption liquid from the lower part of said generator and vaporize said absorption liquid, means to conduct the vapor of the absorption liquid thus formed into said downwardly extending portion and introduce the vapor therein without appreciable drop in pressure, and conduits for completing a circuit of circulation of absorption liquid between the generator and the absorber.

20. Refrigerating apparatus comprising a generator, analyzing means, an evaporator, an absorber, conduits connecting the evaporator and absorber for circulation of gas including an upwardly extending portion and a downwardly extending portion, means to heat said upwardly extending portion, means to cool said downwardly extending portion, means to withdraw absorption liquid from the lower part of said generator and vaporize said absorption liquid, means to conduct the vapor of the absorption liquid thus formed into said downwardly extending portion and conduits for completing a circuit of circulation of absorption liquid between the generator and the absorber.

21. In the operation of absorption refrigerating apparatus of the type including a circuit for flow of gas into which a refrigerant evaporates and which has upwardly and downwardly extending portions, the improvement which consists in introducing substantially pure vapor of absorption liquid into a downwardly extending portion of the gas circuit and externally cooling the downwardly extending portion to condense the vapor.

22. In the operation of absorption refrigerating apparatus of the type including a circuit for flow of gas into which a refrigerant evaporates and which has upwardly and downwardly extending portions, the improvement which consists in introducing substantially pure vapor of absorption liquid into a downwardly extending portion of the gas circuit and externally cooling the downwardly extending portion by air to condense the vapor.

23. A process of refrigeration of the absorption type which consists in expelling a volatile refrigerant at the upper part of a generator and analyzer from a solution thereof in a less volatile absorption medium, leading the expelled refrigerant vapor into a first condenser for condensation and thence to an evaporator, lifting the less volatile absorption medium from the bottom of the generator through a separate heated conduit by evolution of vapor therein into a separating chamber, leading the vapor of absorption medium from said chamber to a second condenser and causing the liquefied absorption medium to pass from said second condenser into an absorber.

GUIDO MAIURI.
RAOUL FELICE BOSSINI.